United States Patent [19]

Kawai

[11] 4,349,852
[45] Sep. 14, 1982

[54] SOUND-DUBBING MECHANISM FOR A VIDEO TAPE RECORDER

[75] Inventor: Tsutomu Kawai, Yokosuka, Japan

[73] Assignees: Funai Electric Co., Ltd., Osaka; Efuti Giken Co., Kanagawa, both of Japan

[21] Appl. No.: 148,004

[22] Filed: May 8, 1980

[51] Int. Cl.³ .......................................... G11B 15/18
[52] U.S. Cl. ..................................... 360/137; 360/62; 360/69; 360/74.1
[58] Field of Search ..................... 360/137, 62, 69, 71, 360/74.1–74.3, 90, 96.3, 96.4; 242/198–200

[56] References Cited

U.S. PATENT DOCUMENTS

| | | | |
|---|---|---|---|
| 3,909,841 | 9/1975 | Holler et al. | 360/62 X |
| 4,227,222 | 10/1980 | Sato et al. | 360/60 |
| 4,229,772 | 10/1980 | Muramatsu | 360/69 |
| 4,253,123 | 2/1981 | Hayashi et al. | 360/69 |

Primary Examiner—John H. Wolff
Attorney, Agent, or Firm—Fisher, Christen & Sabol

[57] ABSTRACT

A sound dubbing control for a videotape recorder includes a mechanism which enables it to be automatically locked in operating condition when the playback control is subsequently actuated; the dubbing control is automatically released when the playback control is released. The dubbing control and playback control each include a slidable member one of which moves transversely with respect to the other and the member for the dubbing control is provided with a leaf spring having parallel arms. One of the arms has a hook-shaped end which catches on a projection on the playback member when the dubbing member is advanced into the path of the playback member. This action also causes the other arm of the spring to actuate a switch controlling the sound dubbing circuit.

9 Claims, 4 Drawing Figures

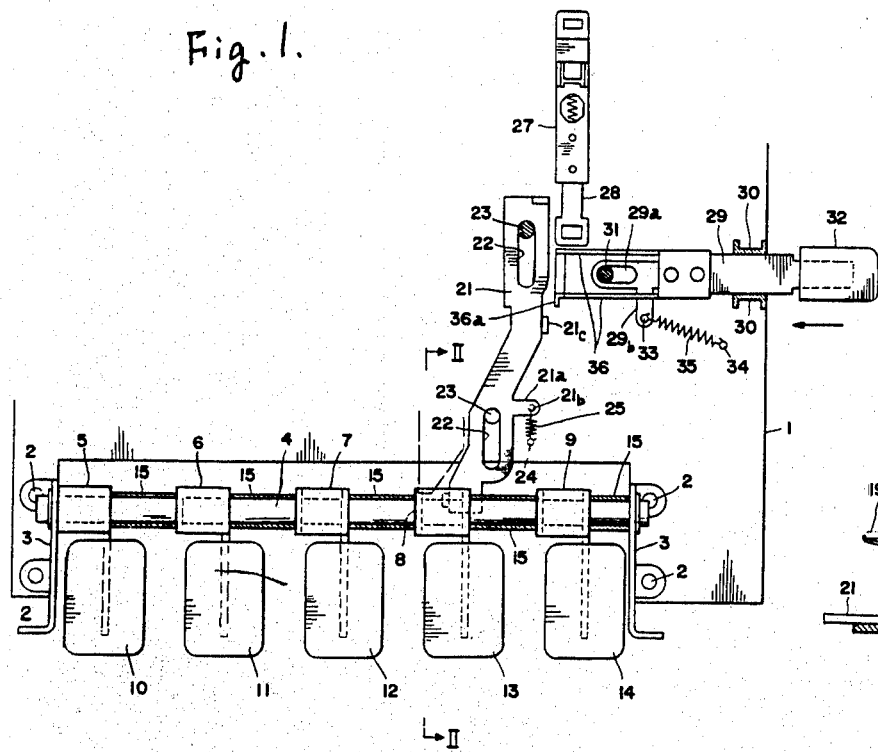
Fig. 1.
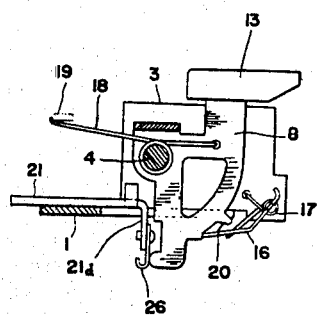
Fig. 2.
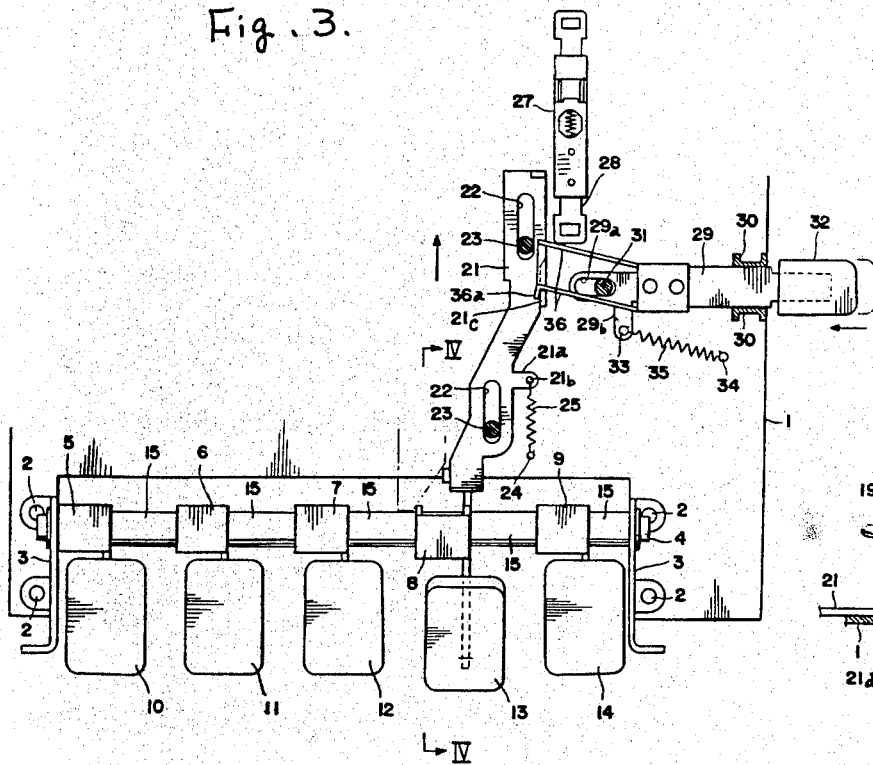
Fig. 3.
Fig. 4.

SOUND-DUBBING MECHANISM FOR A VIDEO TAPE RECORDER

SUMMARY OF THE INVENTION

This device relates to a sound dubbing mechanism for a video tape recorder, and more particularly to a sound dubbing mechanism for keeping pictures (images) as they are and for dubbing a voice only, i.e., for the so-called after recording.

An object of the device is to provide a sound dubbing mechanism capable of setting a sound dubbing mode by simple operation, keeping such mode condition even when a user releases his finger from the sound dubbing button, automatically returning the sound dubbing button by turning-on a stop control button, and being easily assembled into a video tape recorder having a series of control mechanism of relatively complicated construction.

BRIEF DESCRIPTION OF THE DRAWING

FIG. 1 is a plan view of a portion of the control mechanism of a videotape recorder provided with the sound dubbing mechanism of the invention;

FIG. 2 is a sectional view taken on the line II—II of FIG. 1;

FIG. 3 is a plan view similar to FIG. 1, but with the sound dubbing button in operating position, and;

FIG. 4 is a sectional view taken on the line IV—IV of FIG. 3.

DESCRIPTION OF A PREFERRED EMBODIMENT OF THE INVENTION

In the drawings, 1 is a chassis of a videotape recorder on which brackets 3,3 are fixed through screws 2,2.

Between the brackets 3,3 at both sides of chassis 1 is laterally mounted a simple lever shaft 4. Onto the lever shaft 4 are pivoted at regular intervals levers 5,6,7,8 and 9 for rewinding, fast forward, stop, playback and sound recording respectively, the levers 5 through 9 being integral with control buttons 10,11, 12, 13 and 14 respectively.

Collars 15,15 . . . are interposed between the respective levers and between the lever 9 and the bracket 3.

Between the brackets 3,3 is pivoted a retainer 16 of a "<"-like shape. A spring 17 is wound on the pivot portion of retainer 16 and engages at one end with the bracket 3 and at the other end with the lower surface of retainer 16, thereby biasing the retainer 16 clockwise.

A spring 18 is wound onto the lever 4 and engages at one end with the playback control lever 8 and at the other end with a spring seat 19, thereby keeping the playback control lever 8 always in normal position.

The playback control lever 8 and other levers 5, 6, 7 and 9, as shown in FIG. 2, each have a retaining projection 20 integral with each lever, so that when each lever is turned on, the projection 20 at the respective levers 5 to 8 abuts against the retainer 16 to thereby keep each of the levers 5 through 8 in an actuating condition independently.

21 is a playback slide lever provided slidably on the chassis 1. Elongate slots 22,22 mutually parallel are provided in the lever 21 and freely inserted onto guide pins 23,23, whereby the playback slide lever 21 is mounted slidably back and forth through the pins 23,23.

A return spring 25 is provided between a pin 24 erecting from the chassis 1 and a bore 21b in a protuberance 21a of slide lever 21.

Also, the playback slide lever 21 is provided with a tongue 21c at a right angle with the lever 21 and integral therewith, the tongue 21c retaining parallel leaf springs to be hereinafter described, in condition of sound dubbing.

Furthermore, the base end 21d of the playback slide lever 21 is bent downwardly in an L-like shape as shown in FIG. 2, to which bent portion 21 is screwably fixed a spacer 26 hooked at its lower end, the spacer 26 abutting against the lower end of playback control lever 8.

On the other hand, a sound dubbing slide switch 27 is fixed on the chassis 1 at a side backward and rightward of the playback slide lever 21, the switch 27 having an actuator 28. The actuator 28, when the switch 27 is activated, is pushed to switch a circuit (not shown) connected therewith, from a playback mode to a sound dubbing mode.

29 is a sound dubbing lever, which is guided by a pair of guide plates 30,30 and a guide pin 31, thereby sliding perpendicularly to the lever 21, i.e., laterally. A sound dubbing button 32 is fitted onto the rightward end of lever 29.

The guide pin 31 is inserted into an elongate slot 29a formed at the lever 29. A return spring 35 is stretched between a retaining pin 33 mounted on a tongue 29b and a pin 34 at the chassis 1.

Parallel leaf springs 36 are screwably fixed to the sound dubbing lever 29 and serve as both switching piece for turning-on the sound dubbing switch 27 and mode keeper for keeping the button 32 in sound dubbing condition. A bent tongue 36a is integral with the foremost end of one leaf spring 36.

Next, the operation of the sound dubbing mechanism of the device constructed as described will be explained.

In a case that voice only is dubbed keeping a picture (image) as it is, the sound dubbing button is operated to slide the sound dubbing lever 29 leftwardly in FIG. 1 against the return spring 35, thereafter the playback control lever 13, as shown in FIG. 4, is pushed to turn the playback control lever 8 clockwise around the lever shaft 4, the retainer 16 is biased by the spring 17 to abut against the projection 20 to thereby hold the lever 8 in turned-on condition, the lower end of lever 8 pushes the playback slide lever 21 in the direction of the arrow in FIG. 3 to thereby shift the parallel leaf springs 36 rearwardly through the tongue 21c integral with the lever 21, and the actuator 28 of the sound dubbing slide switch 27 is biased, whereby the switch 27 is changed-over to switch into the sound dubbing mode the circuit (not shown) connected with the switch 27.

At this time, since the parallel leaf springs 36 are retained of the bent tongue 36a by the tongue 21c at the lever 21, even when a user releases his finger from the sound dubbing button 32, the button 32 and sound dubbing lever 29 do not restore, thereby keeping the circuit in condition of sound dubbing.

After the sound dubbing is finished operation, the stop control button 12 is operated to turn the retainer 16 counterclockwise from the position shown by the solid line in FIG. 4, whereby the playback control lever 8 restores to its original position. As a result, the playback slide lever 21 is pulled back by the return spring 25 to release the bent tongue 36a from the tongue 21c, so that the sound dubbing button 32, sound dubbing lever 29 and parallel leaf springs 36, automatically restore to the original positions through the spring 35, thereby turning-off the sound dubbing slide switch 27.

What is claimed is:

1. In a videotape recorder of the type wherein circuit means is provided for playing back audio signals recorded on a magnetic tape when in a first condition and for recording audio signals on said magnetic tape when in a second condition and manually operated controls are provided for operation of the videotape recorder and circuit means in a playback mode, a recording mode and for stopping the operation of the recorder, the improvement comprising a sound dubbing mechanism which includes:

manually operated playback lever control means movable between a first inoperative position and an operative second position for operation in said playback mode;

manually operated dubbing control means movable between an inoperative first position and a second position for said dubbing;

said dubbing control means including switch means connected in said circuit means having a first condition for normal operation of said circuit in said playback mode when said manually operated playback lever means is in said second position;

said dubbing control means when in said second position being engaged by said playback lever control means during movement from first to second position to shift said switch means from its first condition to a second condition;

said circuit means, when said switch means is in said second condition being operated in said recording mode for dubbing audio signals on a magnetic tape;

said dubbing control means being responsive to movement of said playback lever control means from its second position to its first position to return said dubbing control means to its first position.

2. Sound dubbing mechanism as defined in claim 1, wherein said dubbing control means includes biasing means urging it toward its first position, and releasable locking means provided to retain it in said second position.

3. Sound dubbing mechanism as defined in either one of claims 1 or 2 wherein said dubbing control means includes a yieldable element movable between a normal unstressed first position and a second position to shift said switch means from its first to second condition, said playback lever control means including another element to engage with and move said yieldable element to its second position.

4. Sound dubbing mechanism as defined in claim 3, wherein said switch means includes a third element movable between first and second positions to shift said circuit means between its playback and recording modes.

5. Sound dubbing mechanism as defined in claim 4, wherein said yieldable element of the dubbing control means comprises an elongated spring.

6. Sound dubbing mechanism as defined in claim 5, wherein said dubbing control means is movable in a direction angularly related to the direction of movement of another element of that playback lever control means, one end of said spring being fixed on the dubbing control means, the free end of the spring being provided with a bent tongue for releasable locking engagement with a tongue fixed on said another element of the playback lever control means.

7. Sound dubbing mechanism as defined in claim 6, wherein said third element of said switch means is movable in a direction generally parallel with the path of movement of said another element of the playback lever control means.

8. Sound dubbing mechanism as defined in claim 7, wherein said yieldable element comprises a pair of parallel spaced springs fixed at one of their ends on the dubbing control means, their free ends being movable together, one of said springs being engaged by said another element of the playback lever control means, the other of said springs engaging with said third element of the switch means.

9. Sound dubbing mechanism as defined in claim 3, wherein said manually operated control for stopping operation is operated to stop the operation when said dubbing control means has been moved to its second position, said dubbing control means will automatically return to its first non-operative position.

* * * * *